(12) United States Patent
Kraus et al.

(10) Patent No.: US 10,119,656 B2
(45) Date of Patent: Nov. 6, 2018

(54) SAFETY SYSTEM

(71) Applicant: Euchner GmbH & Co. KG, Leinfelden-Echterdingen (DE)

(72) Inventors: Matthias Kraus, Ostfildern (DE); Markus Hörtling, Leinfelden-Echterdingen (DE); Monika Schmid, Grossbettlingen (DE); Dominik Schmid, Grossbettlingen (DE); Timo Siefert, Leinfelden-Echterdingen (DE)

(73) Assignee: Euchner GmbH + Co. KG, Leinfelden-Echterdingen (DE)

( * ) Notice: Subject to any disclaimer, the term of this patent is extended or adjusted under 35 U.S.C. 154(b) by 146 days.

(21) Appl. No.: 15/222,995

(22) Filed: Jul. 29, 2016

(65) Prior Publication Data

US 2017/0038005 A1 Feb. 9, 2017

(30) Foreign Application Priority Data

Aug. 6, 2015 (DE) .......................... 10 2015 112 991

(51) Int. Cl.
| | |
|---|---|
| *F16P 3/08* | (2006.01) |
| *E05B 63/00* | (2006.01) |
| *E05B 65/06* | (2006.01) |
| *E05B 65/08* | (2006.01) |
| *E05C 1/04* | (2006.01) |
| *E05B 47/00* | (2006.01) |

(52) U.S. Cl.
CPC ................ *F16P 3/08* (2013.01); *E05B 47/00* (2013.01); *E05B 63/0017* (2013.01); *E05B 65/06* (2013.01); *E05B 65/08* (2013.01); *E05C 1/04* (2013.01); *E05B 2047/0068* (2013.01); *E05B 2047/0069* (2013.01)

(58) Field of Classification Search
None
See application file for complete search history.

(56) References Cited

U.S. PATENT DOCUMENTS

| | | | | | |
|---|---|---|---|---|---|
| 4,618,823 | A | * | 10/1986 | Dahlheimer | ....... H03K 17/9505 324/207.16 |
| 4,982,058 | A | * | 1/1991 | Schroeder | .............. H01H 9/226 200/330 |
| 5,939,961 | A | * | 8/1999 | Fevre | ....................... F16P 3/08 200/61.45 M |

* cited by examiner

*Primary Examiner* — K. Wong
(74) *Attorney, Agent, or Firm* — Michael Soderman

(57) ABSTRACT

The invention relates to a safety system (1) for a separating protective device with a first monitoring device for monitoring whether the separating protective device is bolted with a bolting system and with a second monitoring device for registering the position of the separating protective device. The second monitoring device has a sensor that generates direction-dependent signals and that differs from the first monitoring device.

12 Claims, 2 Drawing Sheets

SAFETY SYSTEM

CROSS REFERENCE TO RELATED APPLICATIONS

This application claims the priority of DE 102015112991.4 filed on 2016 Aug. 6; this application is incorporated by reference herein in its entirety.

BACKGROUND

The invention relates to a safety system in accordance with the preamble of claim 1.

Safety systems of this type are generally used for safety-related applications, in particular for safeguarding danger zones on machines. These danger zones can, in particular, be provided with fences in which a door is arranged as a protective device. The door is secured in a closed position via the safety system to prevent unauthorized access to the danger zone.

The safety system prevents dangerous machine functions from being carried out with the actuation system of the machine as long as the separating protective device, meaning the door, is open.

A safety system of that type is the MGB system of the company Euchner GmbH+Co. KG, as an example. This safety system is comprised of a bolting mechanism via which a separating protective device like a door can be securely bolted in place. The MGB has a handle module arranged on the door in connection with this and a bolting module fixed in place on a frame or the like. A bolt tongue on the handle module is inserted into a receptacle in the bolting module to bolt the door. The bolting of the door can be registered in that a bolting module is detected in the transponder, as a first monitoring device that is arranged on the bolt tongue, via a reading unit when the bolt tongue is inserted into the receptacle.

To increase the functional reliability of the safety system, it has a second monitoring device that is likewise designed in the form of a transponder via which the door position is detected.

In general, further signals are generated with the second monitoring device; the overall system is also secured above and beyond the required range because of that. In particular, this additional safeguard serves to reveal error cases of the first monitoring device. If a defect exists in the first monitoring device, for instance, to the effect that the first monitoring device signals, despite an unbolted door, a bolted state, although this does not exist, the door position can be registered with the second monitoring device and the situation can be detected, in particular, when the door is open. In this case, the malfunction of the first monitoring device is revealed by the second monitoring device and the safety system can bring about a safe condition by initiating an emergency stop for the machine.

The drawback with this system is that the first and second monitoring devices are comprised of a transponder; the transponders are arranged at such a short distance from one another that they could reciprocally influence one another, which can lead to malfunctions of the safety system.

SUMMARY

The invention relates to a safety system (1) for a separating protective device with a first monitoring device for monitoring whether the separating protective device is bolted with a bolting system and with a second monitoring device for registering the position of the separating protective device. The second monitoring device has a sensor that generates direction-dependent signals and that differs from the first monitoring device.

DETAILED DESCRIPTION

The invention is based on the objective of providing a safety system that has a high level of functionality and a high level of functional reliability.

The elements of claim 1 are specified to solve this problem. Advantageous embodiments and useful design developments of the invention are described in the subclaims.

The invention relates to a safety system for a separating protective device with a first monitoring device for monitoring whether the separating protective device is bolted with a bolting system and with a second monitoring device for registering the position of the separating protective device. The second monitoring device has a sensor that generates direction-dependent signals and that differs from the first monitoring device.

A major advantage of the invention is that the first and second monitoring devices are designed in a diverse way so that they will not be able to reciprocally influence one another. This leads to substantially increased functional reliability of the overall safety system as per the invention.

A further major advantage of the invention is that not only a digital signal is generated that indicates whether the separating protective device is closed or open with the sensor as the second monitoring device. Rather, the sensor generates analog, direction-dependent signals via which the course of movement of the separating protective device can be exactly followed. The functional reliability of the safety system can be significantly increased by a suitable evaluation of these sensor signals.

It is especially advantageous that movement directions can be registered in three spatial directions with the sensor.

Complex courses of movement of the separating protective device can be exactly registered because of that.

It is also advantageous that the sensor operates without contact.

The sensor therefore operates in a wear-free manner and accordingly is very robust.

In accordance with an especially advantageous design form of the invention, the sensor is a 3-axis magnetometer, for instance a 3D Hall effect sensor.

The 3-axis magnetometer typically registers the position of a magnet. The 3-axis magnetometer is preferably located on a fixed element here. The magnet is arranged on the separating protective device.

Alternatively, the 3-axis magnetometer can be arranged on the separating protective device and the magnet can be fixed.

Movements in all three spatial directions can be exactly registered with the sensor designed as a 3-axis magnetometer.

In general, a check is not just done with the sensor that constitutes the second monitoring device as to whether the separating protective device is in a closed or open state. Rather, the direction of movement of the separating protective device is registered with the sensor and therefore the complete course of movement of the separating protective device when it approaches the closed position or moves away from it. Improved functional monitoring of the safety system is possible via the evaluation of this additional information.

Furthermore, the signals of the sensor can be used to determine the type of separating protective device. If the separating protective device is designed in the form of a door, for instance, meaning a protective door, whether the door is a sliding door or a swinging door can be ascertained with the aid of the determination of the course of movement of the door via the sensor signals.

It is also advantageous that the movements of the door registered with the sensor are input in a teach-in process.

This teach-in process takes place during the initial operational start-up of the safety system. Manipulation during the subsequent operation of the safety system can therefore be revealed in that the currently measured course of movement of the separating protective device will deviate from the taught-in values.

In accordance with a further advantageous design form, an adjustment or mounting of the separating protective device is done in dependence upon signals generated with the sensor.

The functionality of the safety system as per the invention is further increased with that.

In accordance with an advantageous embodiment of the invention, the separating protective device is designed as a door.

The transponder is designed in a diverse way as the sensor, in particular designed as a 3-axis magnetometer, which constitutes the second monitoring device, so reciprocal influences of these units are ruled out.

In accordance with a useful further design form of the invention, the safety system is a locking safety system that has a locking unit monitored by a third monitoring device; it is advantageous when the third monitoring device is a light barrier.

The safety level of the safety system is further increased because of that. The bolt is secured in the bolted state with the locking unit, which can be designed in the form of a lifting magnet or pawl; uncontrolled access via the separating protective device to the danger zone of a machine is prevented with a high level of security because of that.

BRIEF DESCRIPTION OF THE DRAWINGS

The invention will be explained with the aid of the drawings below. The following are shown in the figures.

DETAILED DESCRIPTION OF THE PREFERRED EMBODIMENTS

Figure 1:
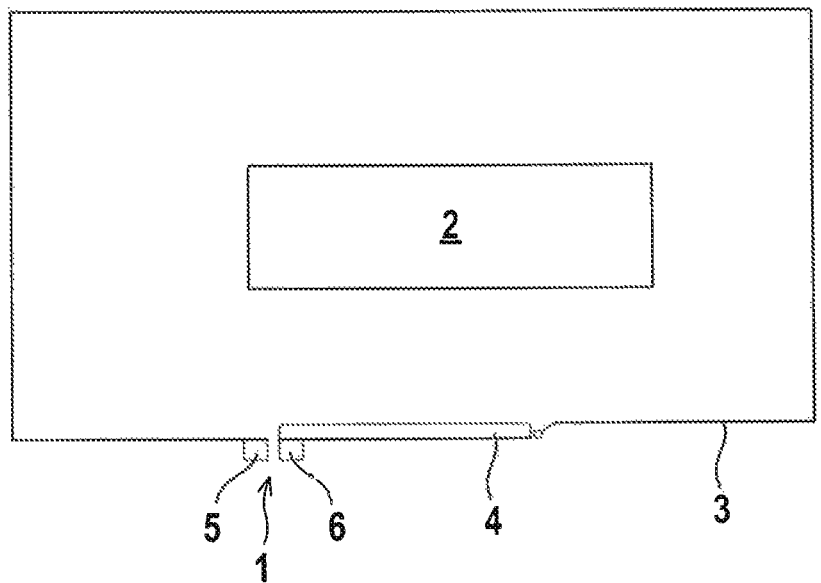
FIG. 1: Schematic diagram of a safety system for securing access to a danger zone.

FIG. 1 shows an example of the safety system 1 as per the invention for securing a danger zone. A danger zone of a machine 2 that can carry out machine functions involving danger is secured in this example. The danger zone is surrounded by a fence 3; a door 4 as a separating protective device is provided in this fence 3 via which persons can obtain access to the danger zone.

The safety system 1 is comprised of a bolting module 5 fixed in place on a frame and a handle module 6 arranged on the door 4. The door 4 can be bolted when it is in its closed position with the safety system 1 designed in this way; access to the danger zone is blocked because of that.

The safety system 1 interacts with the machine control unit in such a way that the operation of the machine 2 to carry out machine functions involving danger is only enabled when the door 4 is bolted with the safety system 1 and access to the danger zone is blocked. The door 4 can only be opened when danger can no longer arise from the machine 2, and a corresponding signal is set by the control unit of the machine 2.

Figure 2:
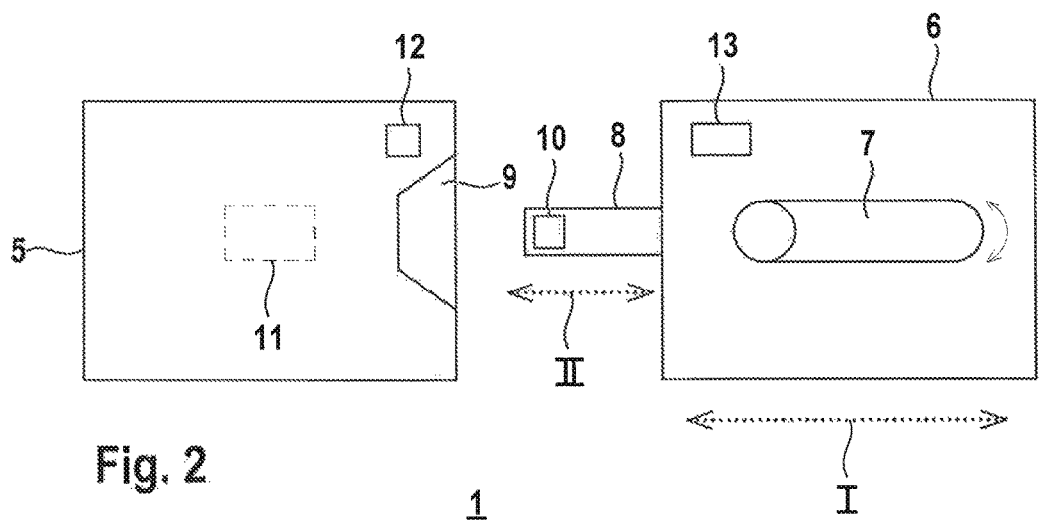
FIG. 2: Detailed diagram of the safety system for bolting a sliding door.

FIG. 2 shows an example of the safety system 1 in which the handle module 6 is arranged on a sliding door. In this case, the door 4 with the handle module 6 is linearly moved towards, or away from, the bolting module 5. This upwards linear movement is marked with the arrow I in FIG. 2. The outside of the handle module 6 has a door handle 7 in a familiar way. A bolt can be actuated with the door handle 7.

The bolt is comprised of a bolt tongue 8 that is arranged on the face of the handle module 6 turned towards the bolting module 5. The bolt tongue 8 can be moved in and out with a linear positioning movement in the direction marked by the arrow II. A receptacle 9 that is arranged on the face of the bolting module 5 turned towards the handle module 6 is provided in the bolting module 5 as a second component of the bolting process. The bolt tongue 8 is moved out and inserted into the receptacle 9 to bolt the door 4 as soon as it is in its closed position; the door 4 is bolted shut because of that.

A transponder 10, as the first monitoring device, is provided at the free end of the bolt tongue 8 to check the bolting of the door 4. A reading unit 11 is arranged in the bolting module 5 for this transponder 10. If the door 4 is bolted shut, meaning that the bolt tongue 8 has been inserted into the receptacle 9, a code existing in the transponder 10 is registered with the reading unit 11; the first monitoring device checks that the door 4 is bolted shut because of that.

The safety system 1 can be further developed into a locking safety system in which, in addition to the bolt, a locking unit that is not shown in the drawings is provided that secures the bolt in its bolted state. The locking unit can be monitored or controlled with a light barrier, as an example.

In accordance with the invention, a 3-axis magnetometer 12 for registering the position of the door 4 is arranged in the bolting module 5 as a second monitoring device. A magnet 13 that is arranged in the handle module 6 is detected with the 3-axis magnetometer 12. Any other sensor with which a direction can be identified in three dimensions in a no-contact fashion can also be used in place of a 3-axis magnetometer 12.

The 3-axis magnetometer 12 does not just do a check as to whether the door 4 is in its closed position or not. Rather, the direction of movement of the magnets 13 and therefore the door 4 is registered with the 3-axis magnetometer 12, meaning that the three-dimensional movement profile of the door 4 can be registered with the aid of signals generated by the 3-axis magnetometer 12.

The functional reliability of the safety system 1 can be improved with the combination of signals of the transponder 10, as the first monitoring device, and of the 3-axis magnetometer 12, as the second monitoring device. In particular, malfunctions of the transponder 10, meaning the first monitoring device in general, can be revealed with the aid of the signals of the 3-axis magnetometer 12. Furthermore, the second monitoring device can be used to test the plausibility of the first monitoring device.

Since the 3-axis magnetometer 12, as the first monitoring device, has a diverse design with respect to the transponder 10, as the second monitoring device, reciprocal influences of these monitoring devices are ruled out. Moreover, in a further design form of the safety system 1 into a locking safety system, reciprocal influences of the 3-axis magnetometer 12 with the light barrier, as the third monitoring device for checking the locking unit, is ruled out because these monitoring devices also have diverse designs.

Figure 3:
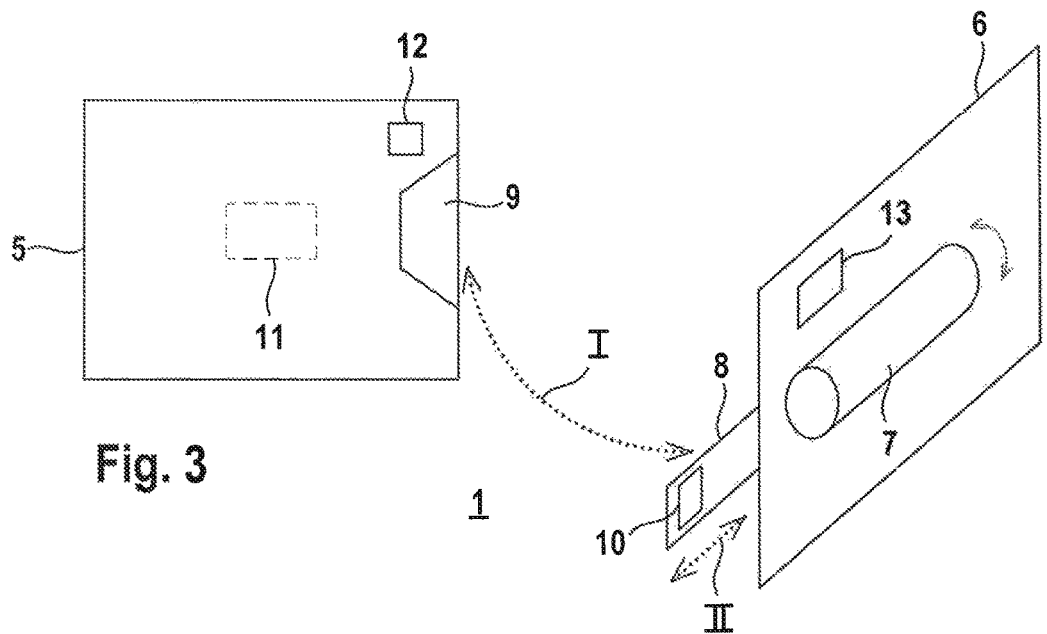
FIG. 3: Detailed diagram of the safety system for bolting a swinging door.

FIG. 3 shows an application of the safety system 1 for a swinging door. The structure of the safety system 1 in accordance with FIG. 3 exactly corresponds to the safety system 1. Since movements in all three spatial directions can be registered with the 3-axis magnetometer 12, the swinging movement of the swinging door (marked with the arrow I in FIG. 3) can also be completely registered with the 3-axis magnetometer 12.

The signals of the 3-axis magnetometer 12 can also be used to identify the type of door 4 in general. In particular, whether the door 4 is designed as a sliding door (FIG. 2) or as a swinging door (FIG. 3) can be identified via the detection of the movement profile of the door 4 with the 3-axis magnetometer 12.

The movement profile of the door 4 registered with the 3-axis magnetometer 12 is advantageously input in a teach-in process during the initial operational startup of the safety system 1. Manipulation of the door 4 can be revealed via a comparison of the current signals of the 3-axis magnetometer 12 during operation subsequent to the initial operational startup with the taught-in values.

Finally, the signals of the 3-axis magnetometer 12 can be used as an adjustment aid or magnet aid when the door 4 is adjusted or mounted.

LIST OF REFERENCE NUMERALS (1) Safety System
(2) Machine
(3) Fence
(4) Door
(5) Bolting module
(6) Handle module
(7) Door handle
(8) Bolt tongue
(9) Receptacle
(10) Transponder
(11) Reading unit
(12) 3-axis magnetometer
(13) Magnet

The invention claimed is:

1. Safety system (1) for a separating protective device with a first monitoring device for monitoring whether the separating protective device is bolted via a bolt and with a second monitoring device for registering the position of the separating protective device, characterized in that the second monitoring device has a sensor differing from the first monitoring device that generates direction-dependent signals, in that the first monitoring device and the second monitoring device have diverse designs with respect to one another and do not reciprocally influence one another, in that the sensor is a 3-axis magnetometer (12), in that the 3-axis magnetometer (12) interacts with a magnet (13), and in that the 3-axis magnetometer (12) is arranged on an element that is fixed in place and that the magnet (13) is arranged on the separating protective device.

2. Safety system according to claim 1, characterized in that movement directions can be registered in three spatial directions with the sensor.

3. Safety system according to claim 1, characterized in that the sensor operates in a contact-free manner.

4. Safety system according to claim 1, characterized in that the direction of movement of the separating protective device is registered via the sensor.

5. Safety system according to claim 1, characterized in that the type of separating protective device is identified via the sensor.

6. Safety system according to claim 1, characterized in that the movements of the door (4) registered by the sensor are input in a teach-in process.

7. Safety system according to claim 1, characterized in that the separating protective device is adjusted or mounted in dependence upon signals generated with the sensor.

8. Safety system according to claim 1, characterized in that the separating protective device is designed as a door (4).

9. Safety system according to claim 8, characterized in that the door (4) is a sliding door or a swinging door.

10. Safety system according to claim 1, characterized in that the first monitoring device is a transponder (10) for monitoring the bolting status of the bolt.

11. Safety system according to claim 1, characterized in that it is a locking safety system, wherein the locking safety system has a locking unit monitored by a third monitoring device.

12. Safety system according to claim 11, characterized in that the third monitoring device is a light barrier.

* * * * *